United States Patent
Rossini

(10) Patent No.: US 9,595,138 B2
(45) Date of Patent: Mar. 14, 2017

(54) AUGMENTED REALITY DISPLAY DEVICE

(71) Applicant: Umberto Rossini, Coublevie (FR)

(72) Inventor: Umberto Rossini, Coublevie (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 271 days.

(21) Appl. No.: 14/290,095

(22) Filed: May 29, 2014

(65) Prior Publication Data
US 2015/0348321 A1  Dec. 3, 2015

(51) Int. Cl.
| G09G 5/00 | (2006.01) |
| G06T 19/00 | (2011.01) |
| G02B 27/01 | (2006.01) |
| G06F 3/01 | (2006.01) |

(52) U.S. Cl.
CPC ........ *G06T 19/006* (2013.01); *G02B 27/0103* (2013.01); *G02B 27/0172* (2013.01); *G06F 3/013* (2013.01); *G06T 2215/16* (2013.01); *G06T 2219/2004* (2013.01)

(58) Field of Classification Search
CPC .............................. G02B 27/017; G06T 19/006
See application file for complete search history.

(56) References Cited

U.S. PATENT DOCUMENTS

| 5,661,608 A | 8/1997 | Barbier et al. | |
| 2005/0140644 A1* | 6/2005 | Mukawa | G02B 5/1876 |
| | | | 345/156 |
| 2006/0227067 A1* | 10/2006 | Iwasaki | G02B 27/00 |
| | | | 345/8 |
| 2007/0052183 A1 | 3/2007 | Draudt et al. | |
| 2008/0030650 A1* | 2/2008 | Kitagawa | G02B 6/0068 |
| | | | 349/65 |
| 2009/0091838 A1* | 4/2009 | Zaloum | G02B 27/017 |
| | | | 359/630 |
| 2012/0154920 A1* | 6/2012 | Harrison | G02B 3/0056 |
| | | | 359/619 |
| 2013/0016413 A1* | 1/2013 | Saeedi | G02B 27/01 |
| | | | 359/205.1 |

FOREIGN PATENT DOCUMENTS

| EP | 0677970 | 10/1995 | |
| GB | WO 2012055824 A1 * | 5/2012 | ........... G02B 26/004 |
| WO | 2007052183 | 5/2007 | |

OTHER PUBLICATIONS

Institut National De La Propriete Industrielle, Rapport de Recherche (Search Report in French language), Dec. 6, 2013 in French priority application.

\* cited by examiner

*Primary Examiner* — Charles Tseng
(74) *Attorney, Agent, or Firm* — Kevin R. Erdman; Brannon Sowers & Cracraft PC

(57) ABSTRACT

An HMD-type device for displaying an image in augmented reality, comprising: an assembly of light display pixels arranged on a first surface of a transparent support intended to be positioned on the optical path between a user's eye and a real scene to be observed, this assembly comprising a number N greater than 1 of pixel sub-assemblies, each comprising a sufficient number of pixels to display the entire image; and an optical system arranged on a second surface of the support opposite to the first surface, this system comprising N optical sub-systems, each pixel sub-assembly facing one of the optical sub-systems.

20 Claims, 2 Drawing Sheets

AUGMENTED REALITY DISPLAY DEVICE

CROSS-REFERENCE TO RELATED APPLICATIONS

The present application claims priority under 35 U.S.C. §119 of French Patent Application Serial Number 13/54947, filed May 30, 2013, and European Patent Application Serial Number 14169892.8, filed May 26, 2014, the disclosures of which are incorporated by reference herein.

BACKGROUND OF THE INVENTION

Field of the Invention

The present disclosure relates to an augmented reality display device, and more particularly aims at a device intended to be worn on the head, particularly, a device of eyeglass or mask type.

Description of the Related Art

Augmented reality image display comprises superimposing, to an image of the real world, an image containing additional information for an observer, for example, information relative to his/her environment, position, displacement speed, etc.

Augmented reality display devices intended to be worn on the head are generally designated with acronym HMD, for "Head Mounted Display". Such devices may comprise a beam splitter placed a few millimeters or centimeters away from a user's eye, and inclined by 45 degrees with respect to the average optical axis of the eye, through which the user can see a real scene in transparency. A miniaturized projection system enables to display information on the beam splitter, so that this information is perceived by the user as being integrated to the real scene seen through the beam splitter.

Existing devices however have various disadvantages, particularly their significant bulk, their complexity, and the high electric power consumption of the projection system.

SUMMARY OF THE INVENTION

An object of an embodiment is to provide a HMD augmented reality image display device, overcoming all or part of the disadvantages of existing devices.

Thus, an embodiment provides an HMD-type device for displaying an image in augmented reality, comprising: an assembly of light display pixels arranged on a first surface of a transparent support intended to be positioned on the optical path between a user's eye and a real scene to be observed, this assembly comprising a number N greater than 1 of pixel sub-assemblies, each comprising a sufficient number of pixels to display the entire image; and an optical system arranged on a second surface of the support opposite to the first surface, this system comprising N optical sub-systems, each pixel sub-assembly facing one of the optical sub-systems.

According to an embodiment, in front view, neighboring optical sub-systems are contiguous.

According to an embodiment, the pixels are non contiguous and the space between pixels is compatible with the visualizing of a real scene in transparency through the support.

According to an embodiment, in top view, each pixel is placed in a central portion of a free surface of any other pixel, so that the surface area of the support effectively occupied by the pixels does not exceed 20 percents of the total area of the surface of the support having the pixels arranged thereon.

According to an embodiment, at a given time, only a portion of each pixel sub-assembly, visible with the eye from a determined eye box, is activated.

According to an embodiment, the activated portion has a dimension of approximately $f*(Len+B)/e$, where f is the focal distance of the corresponding optical sub-system, Len is the diameter of the corresponding optical sub-system, B is the dimension of the eye box, and e is the optical path between the optical system and the eye.

According to an embodiment, the device further comprises an eye tracking device enabling to know, at any time, the relative position of the user's eye with respect to the display device, and a control circuit capable, in each pixel sub-assembly, of activating or deactivating pixels according to the detected eye position.

According to an embodiment, each pixel sub-assembly extends over a surface area substantially equal to that of the optical sub-system in front of which it is located.

According to an embodiment, each pixel sub-assembly contains a sufficient number of pixels to display an image of approximately 320 by approximately 240 pixels.

According to an embodiment, the optical sub-systems are all substantially identical, dimension Len, in a given direction parallel to the support, of an optical sub-system, being approximately equal to value $Q*f*Len/e$, where Q is the number of optical sub-systems in said direction, f is the focal distance of said optical sub-systems, and e is the optical path between the optical system and a user's eye.

According to an embodiment, number Q of optical sub-systems, in a given direction parallel to said support, is at least equal to the integer greater than value $e/f$, where e designates the optical path between the optical system and a user's eye, and f designates the focal distance of the optical sub-systems.

According to an embodiment, the pixels of the pixel assembly are arranged in an array and regularly distributed over the entire surface of the support.

According to an embodiment, the pixels are formed in OLED technology.

According to an embodiment, the pixel assembly is in the object focal plane of the optical system.

According to an embodiment, the support is a transparent plate having a thickness smaller than or equal to 3.5 millimeters.

According to an embodiment, the optical system is made in the form of a reflective hologram.

According to an embodiment, the display device has the general shape of eyeglasses or of a mask.

The foregoing and other features and advantages will be discussed in detail in the following non-limiting description of specific embodiments in connection with the accompanying drawings.

BRIEF DESCRIPTION OF THE DRAWINGS

The above mentioned and other features and objects of this invention, either alone or in combinations of two or more, and the manner of attaining them, will become more apparent and the invention itself will be better understood by reference to the following description of an embodiment of the invention taken in conjunction with the accompanying drawings, wherein.

Figure 1:
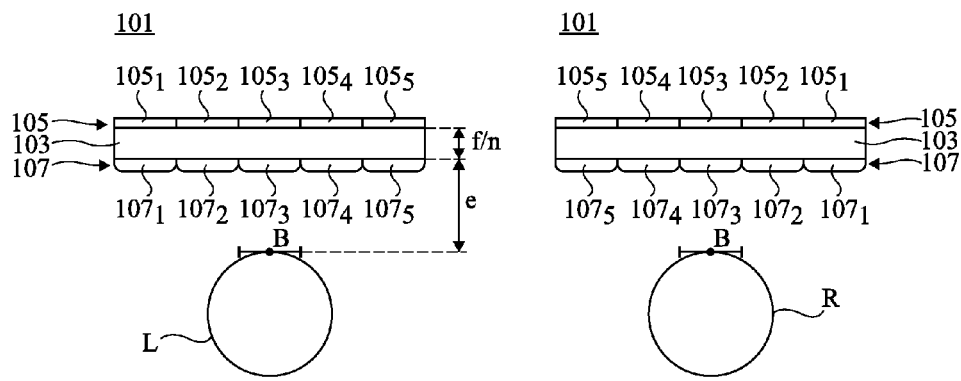
FIG. 1 is a simplified cross-section view illustrating an embodiment of an augmented reality image display device.

For clarity, the same elements have been designated with the same reference numerals in the different drawings and, further, as usual in the representation of optical systems, the various drawings are not to scale. Thus, corresponding reference characters indicate corresponding parts throughout the several views. Although the drawings represent embodiments of the present invention, the drawings are not necessarily to scale and certain features may be exaggerated in order to better illustrate and explain the full scope of the present invention. The diagrams are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

In the following description, unless otherwise indicated, terms "approximately", "substantially", "about", and "in the order of" mean "to within 10%".

According to an aspect of an embodiment, an augmented reality image display device is provided, which comprise, on a surface of a transparent support intended to be placed a few millimeters or centimeters away from a user's eye, light display pixels. The transparent support, for example a transparent plate, may be mounted to form an angle of approximately 90 degrees with the average optical axis of the eye, for example, as an eyeglass lens or a mask screen. The pixel dimensions and the spacing between pixels are selected to enable to visualize a real scene in transparency through the support. The pixels enable to add information to the real scene image seen through the support. An optical system may be provided on the optical path between the pixels and the eye, so that the information displayed by the pixels is perceived by the user as being at the same distance as the real scene (for example, at infinity). The user thus needs not make any accommodation effort, which limits his/her visual fatigue.

FIG. 1 is a simplified cross-section view illustrating an embodiment of an augmented reality image display device. The device of FIG. 1 has the general shape of eyeglasses. Facing each of the user's left and right eyes L and R, is located a display 101 comprising a transparent support 103, for example, a transparent plate such as a glass plate and, on a surface of support 103 (opposite to the eye in the shown example), an assembly 105 of light display pixels, for example, OLED pixels ("Organic Light Emitting Diode"), defining an image source. The displays may be fastened to a frame of eyeglass frame type, not shown. The pixel dimensions and the spacing between pixels are selected to enable to view a real scene in transparency through support 103. As an example, in front view, each pixel has an approximately square general shape having a side length in the range from 1 to 10 µm, the edges of neighboring pixels being separated by a non-zero distance, for example, in the range from 5 to 15 µm. In a preferred embodiment, in front view, each pixel is placed in a central portion of a surface free of any other pixel, so that the surface area effectively occupied by the pixel (that is, the surface which does not let through the light originating from the real scene) does not exceed 20 percents of this free surface. Each display 101 further comprises, on a surface of support 103 opposite to image source 105 (that is, on the eye side in the shown example), an optical system 107 adapted for the information displayed by image source 105 to be perceived by the user as being at the same distance from the user as the real scene (for example, collimated to infinity).

A significant constraint to be respected is to take into account possible motions of the user's eye in front of display 101, and thus to provide an optical system 107 having a sufficiently wide exit pupil so that the eye motions in front of display 101 do not imply a loss of the information displayed by the pixels. Another constraint is to provide a relatively compact display. In particular, the focal distance of optical system 107 should preferably be relatively small.

To obtain a simple and compact display 101 having an exit pupil of significant size, it is here provided to divide display 101 into a plurality of parallel sub-displays.

Optical system 107 is divided into a plurality of optical sub-systems. In the cross-section view of FIG. 1, optical system 107 is divided into five identical optical sub-systems 1071, 1072, 1073, 1074, and 1075. It should be noted that this number may be variable. In the shown example, each optical sub-system 107$i$ (i being an integer from 1 to 5 in this example) is formed of a lens located on the surface of support 103 opposite to image source 105. In this example, image source 105 is placed substantially in the object focal plane of optical sub-systems 107$i$, so that the images displayed in augmented reality are collimated to infinity. In the device of FIG. 1, the distance between image source 105 and optical system 107 is determined by the thickness of transparent plate 103. Plate 103 is thus selected to be such that its thickness, multiplied by its optical index n, is approximately equal to focal distance f of optical sub-systems 107$i$. The described embodiments are however not limited to this specific case, and image source 105 may be placed at an equivalent optical distance from optical system 107 greater or smaller than its focal distance f. For bulk and aspect reasons, the thickness of plate 103 is preferably selected to be smaller than or equal to 5 millimeters, for example, smaller than or equal to 3.5 millimeters.

Pixel assembly 105 is divided into as many pixel sub-assemblies as the display comprises optical sub-systems 107$i$. Each pixel sub-assembly defines an elementary image source and is associated with one of optical sub-systems 107$i$ of system 107. In the cross-section view of FIG. 1, five elementary image sources 1051, 1052, 1053, 1054, and 1055 are shown, such elementary sources being respectively located in front of optical sub-systems 1071, 1072, 1073, 1074, and 1075.

The assembly formed of a pixel sub-assembly 105$i$ and of the associated optical sub-system 107$i$ will be called sub-display herein. Display 101 thus comprises a plurality of parallel sub-displays.

By forming a plurality of parallel sub-displays, a complete display having a large total exit pupil (sum of the sizes of the exit pupils of each of the sub-displays) may be obtained, while forming simple and compact optical sub-systems.

Display 101 may be provided so that each sub-display displays part of the information, the full information being recombined by optical sub-systems 107*i* at the user's eye level.

However, in a preferred embodiment, each pixel sub-assembly 105*i* contains a sufficient number of pixels to display the entire image which is desired to be superimposed to the real scene. As will be discussed in further detail in relation with FIGS. 2 to 4, such a pixel redundancy provides a very good tolerance of the device to the user's eye motions, and thus enables to avoid by a large extent for the user's eye motions to cause a loss of information for the user. As an example, each pixel sub-assembly 105*i* contains a sufficient number of pixels to display an image having a resolution of approximately 320 by approximately 240 pixels.

To obtain a good readability of the information displayed in augmented reality, the lenses of optical sub-systems 107*i* are preferably contiguous in top view so that there is no space between the images or image portions emitted by the sub-displays, and that the user perceives the displayed information continuously. Of course, the contiguous character of the lenses is defined within the eye pupil tolerance limit. Thus, a small interval between lenses may be acceptable. In top view, lenses 107*i* for example have an approximately square or rectangular shape.

Figure 2:
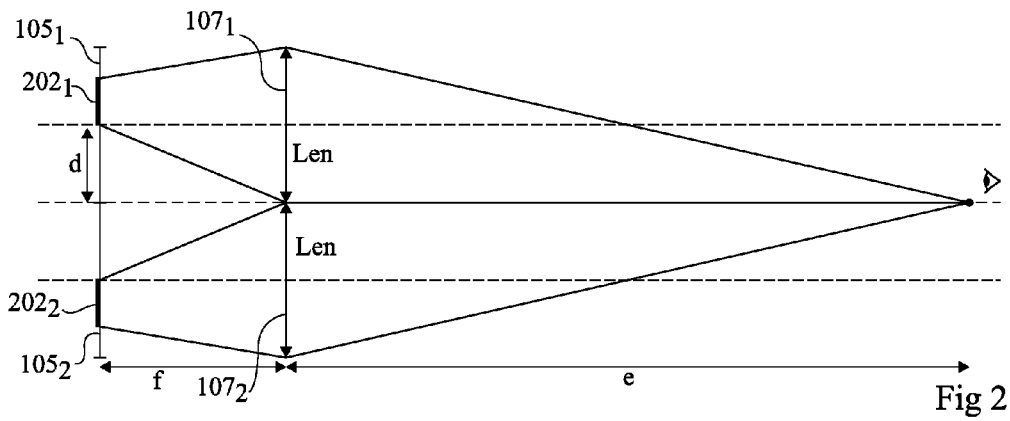
FIGS. 2, 3, and 4 illustrate examples of geometric rules for the design of a device of the type described in relation with FIG. 1.
Figure 3:
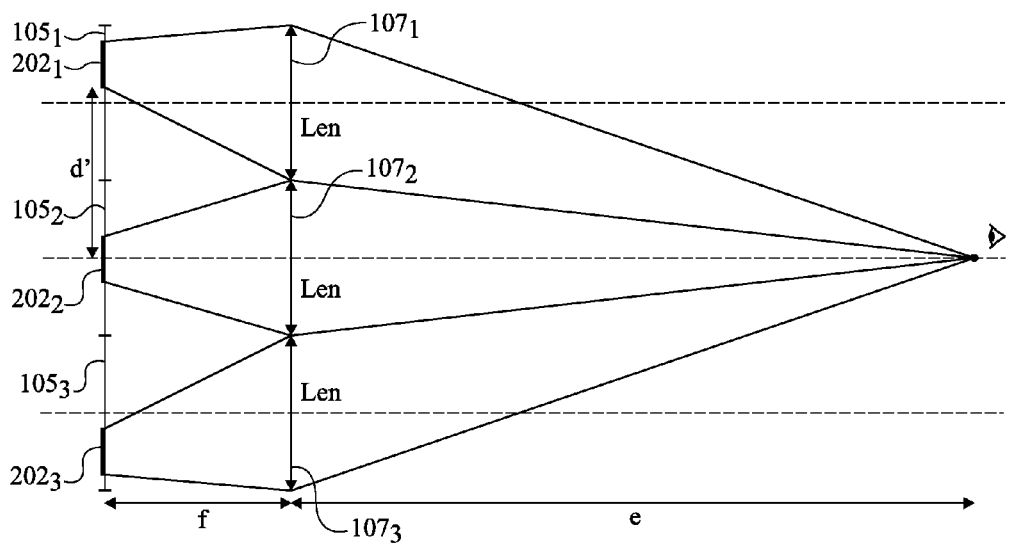
Figure 4:
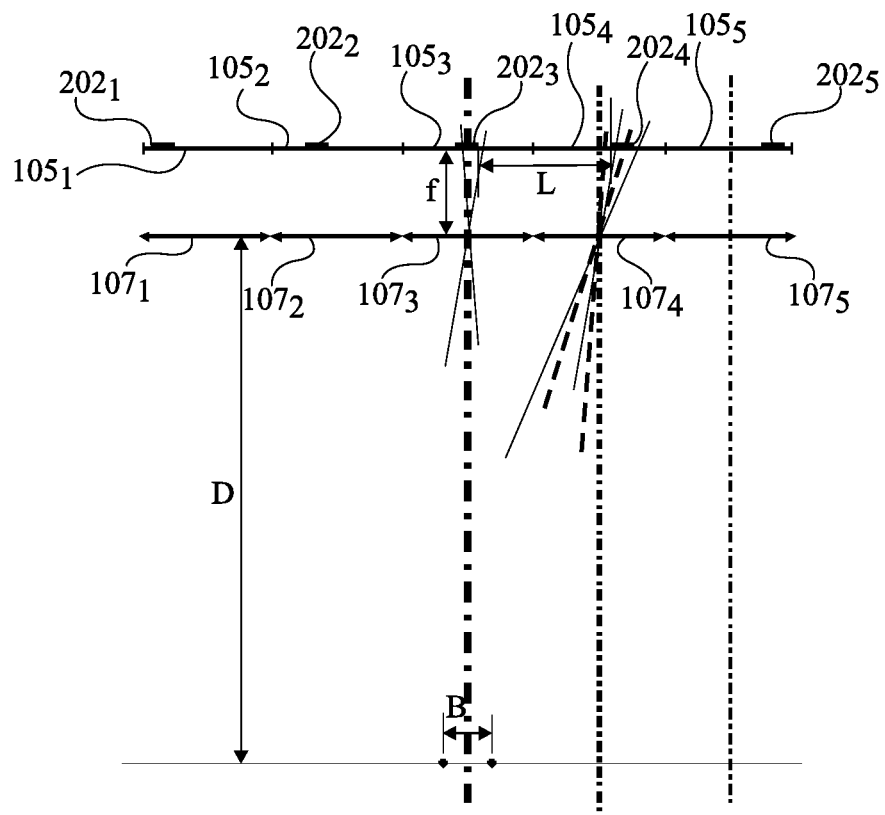

FIGS. 2, 3, and 4 illustrate examples of geometric rules enabling to better understand the operation of a device of the type described in relation with FIG. 1.

In FIG. 2, an optical structure comprising two pixel sub-assemblies 1051 and 1052, placed in a same plane, respectively in front of optical sub-systems 1071 and 1072 is considered. In this example, pixel sub-assemblies 1051 and 1052 are placed in the object focal plane of optical sub-systems 1071 and 1072. Pixel sub-assemblies 1051 and 1052 and optical sub-systems 1071 and 1072 extend symmetrically on either side of the main optical axis of the structure.

This drawing aims at showing the surface of each pixel sub-assembly effectively seen by the user when the optical axis of the eye coincides with the main optical axis of the structure, and when the user's eye is at a distance e from optical sub-systems 1071 and 1072. Distance e, called optical path, is for example in the range from 10 to 20 millimeters in the case of a device such as eyeglasses described in relation with FIG. 1.

As shown in FIG. 2, only a portion 2021 of pixel sub-assembly 1051 and a portion 2022 of pixel sub-assembly 1052 are seen by the observer's eye. Thus, considering an observer having a still eye such as in FIG. 2, only portions 2021 and 2022 of pixel sub-assemblies 1051 and 1052 are useful for the observation. The rest of the pixel sub-assemblies may be disconnected or, also, the pixel sub-assemblies may be reduced to their portions 2021 and 2022 only, for a same visibility of the information.

Useful portions 2021 and 2022 of pixel sub-assemblies 1051 and 1052 have a dimension approximately equal to f*Len/e, Len being the diameter of optical sub-systems 1071 and 1072. The edges of useful portions 2021 and 2022 of pixel sub-assemblies 1051 and 1052 are located at a distance d approximately equal to Len/2 from the main optical axis of the structure. The edge-to-edge distance between useful portions 2021 and 2022 of pixel sub-assemblies 1051 and 1052 is approximately equal to diameter Len of the optical sub-systems.

In FIG. 3, a structure comprising three pixel sub-assemblies 1051, 1052, and 1053, placed in a same plane, respectively in front of optical sub-systems 1071, 1072, and 1073, is considered. In this example, pixel sub-assemblies 1051, 1052, and 1053 are placed in the object focal plane of optical sub-systems 1071, 1072, and 1073. The central sub-display, formed by pixel sub-assembly 1052 and optical sub-system 1072, has its optical axis confounded with the main optical axis of the structure, and the peripheral sub-displays extend on either side of the central sub-display, symmetrically with respect to the main optical axis of the structure.

The case where the optical axis of the user's eye coincides with the main optical axis of the structure and where the user's eye is at a distance e from central optical sub-system 1072 is considered.

As shown in FIG. 3, only a portion 2021 of pixel sub-assembly 1051, a portion 2022 of pixel sub-assembly 1052, and a portion 2023 of pixel sub-assembly 1053 are visible by the eye. Thus, considering an observer having a still eye such as in FIG. 3, only portions 2021, 2022, and 2023 and of pixel sub-assemblies 1051, 1052, and 1053 are useful for the observation. The rest of the pixel sub-assemblies may be disconnected, or the pixel sub-assemblies may be reduced to their portions 2021, 2022, and 2023 only, for a same visibility of the information.

Useful portions 2021, 2022, and 2033 of pixel sub-assemblies 1051, 1052, and 1053 have a dimension substantially equal to f*Len/e, Len being the diameter of optical sub-systems 1071, 1072, and 1073. Useful portion 2022 of the central sub-display is centered on the main optical axis of the structure, and the edges of useful portions 2021 and 2023 of the peripheral sub-displays are located at a distance d' substantially equal to Len+f*Len/2e from the main optical axis of the structure. The edge-to-edge distance between useful portions 2021 and 2022 on the one hand, and 2022 and 2023 on the other hand, is approximately equal to diameter Len of the optical sub-systems.

More generally, whatever the position of a sub-display in a display comprising an even or odd number of sub-displays, the useful portion of the elementary image source of this sub-display (visible for a given eye position), has a dimension approximately equal to f*Len/e.

The image which is desired to be displayed in augmented reality may be divided into blocks which are distributed between the different sub-displays according to the position of each sub-display with respect to the main optical axis of the complete display. Sub-displays at the display periphery are useful to display peripheral portions of the image, and sub-displays at the center of the display are useful to display central portions of the image. In practice, each sub-display 105*i* may display the entire image, but only the portion of the image corresponding to useful portion 202*i* of the sub-display is seen by the user. The sub-display portion which is not visible by the user may be deactivated. In this case, sub-display 105*i* only projects a portion of the image.

To define the useful surface of each of the pixel sub-assemblies in operation, account should also be taken of the fact that the user's eye is likely to move, according to a maximum amplitude which is predefined. The case of an exclusively lateral eye motion is considered hereafter as an example. However, the described teachings also apply to a vertical eye motion.

The space within which the observer's eye can move while receiving the full information is called "eye box". The positioning and the size of pixel sub-assemblies 105*i* may be adapted according to a predefined desired eye box. Hereafter, the maximum accepted eye motion amplitude, equal to the size of the eye box, will be called B.

FIG. 4 illustrates a structure comprising a number Q=5 of sub-displays, each comprising a pixel sub-assembly (respectively 1051, 1052, 1053, 1054, and 1055) facing an optical sub-system (respectively 1071, 1072, 1073, 1074, and 1075). Each pixel sub-assembly 105$i$ has, in this example, a length approximately equal to Len, and is centered on the optical axis of the optical sub-system 107$i$ associated therewith. In this example, pixel sub-assemblies 105$i$ are placed in the object focal plane of optical sub-systems 107$i$.

In the case of a zero eye box size B (the smallest motion of the observer's head implies a loss of information), it has been seen hereabove that useful portions 202$i$ of pixel sub-assemblies 105$i$ have a length approximately equal to f*Len/e and are distant by an edge-to-edge distance approximately equal to Len (the centers of useful portions 202$i$ are thus distant by approximately Len+f*Len/e).

In the case of a non-zero eye box size B, the visible portion of each pixel sub-assembly 105$i$, of dimension f*Len/e, displaces when the eye displaces in the eye box. In FIG. 4, full lines delimit the focal plane area visible when the eye moves leftwards in the drawing by a distance B/2 and dotted lines delimit the focal plane area visible when the eye moves rightwards in the drawing by a distance B/2. If a complete image is desired to be seen whatever the eye position in the eye box, the image should be displayed on portions of pixel sub-assemblies 105$i$ positioned and sized to correspond to the overlapping area of the visible regions at both ends of the eye box. Thus, "useful" portions 202$i$ of pixel sub-assemblies 105$i$ should be enlarged by a length fB/2e to the left and by a length fB/2e to the right with respect to the case of a zero eye box size. In other words, for each pixel sub-assembly 105$i$, for a given eye position in the eye box, the portion of sub-assembly 105$i$ visible by the user's eye has a dimension in the order of f*Len/e and, when the eye scans the entire eye box space, the useful portion of sub-display 105$i$ which is seen (scanned) by the eye has a dimension of approximately f*Len/e+f*B/e. For a same visibility of the information, the rest of pixel sub-assembly 105$i$ may be disconnected, or the pixel sub-assembly may be reduced to its useful portion 202$i$ of length f*(Len+B)/e only (the edge-to-edge distance of useful portions 202$i$ is then smaller than Len).

In a preferred embodiment, to obtain a large eye box, the pixels of assembly 105 are regularly distributed in an array of rows and columns extending substantially over the entire surface of support 103, optical sub-systems 107$i$ substantially covering the entire surface of support 103 opposite to assembly 105, and each elementary source 105$i$ being formed by the portion of assembly 105 located in front of the corresponding optical sub-system 107$i$. Thus, each pixel sub-assembly 105$i$ occupies substantially the entire surface opposite to the optical sub-system 107$i$ associated therewith. Further, each pixel sub-assembly 105$i$ preferably has a resolution at least equal to that of the image which is desired to be displayed in augmented reality. Further, size Len of sub-lenses 107$i$ is preferably approximately equal to or greater than the sum of the useful portions (visible for a given eye position) of sub-assemblies 105$i$, which is approximately Q*f*Len/e.

As an example, it may be provided for each pixel sub-assembly 105$i$ to display the entire image. For a given eye position, the user then will only see a portion of the image displayed by each of the sub-displays, the total image being recombined by the optical sub-systems at the level of the user's eye.

As a variation, an augmented reality display device comprising, in addition to the above-mentioned elements, an "eye tracking" device, enabling to know, at any time, the relative position of the user's eye with respect to the main optical axis of the device, may be provided. To decrease the electric consumption of the device, it may then be provided to take into account the eye position, to only power the pixels of assembly 105 visible with the eye (for a given eye position). As an example, the powering of the rows and/or columns of each sub-array 105$i$ of pixels may be controlled by the measurement provided by the eye tracking device.

As an example of numerical application, the case of a substantially square transparent plate 103 having a side length of approximately 21 mm, a thickness ep in the order of 3 mm, and an optical index n substantially equal to 2 is considered. In this example, an eye-to-lens distance e of approximately 15 mm is considered. Focal distance f of lenses 107$i$, here determined by the thickness and the optical index of plate 103, is then approximately equal to 6 mm. In this example, lenses 107$i$ having an aperture x in the order of 1.45, that is, having a diameter Len in the order of f/x=4.14 mm, are provided. Further, in this example, a distance dpix between pixels in the order of 14 μm (from center to center) is provided. Each pixel sub-assembly 105$i$ occupying substantially the same surface area as lens 107$i$ associated therewith, the resolution of each pixel sub-assembly 105$i$ is in the order of Z=Len/dpix=296 pixels (number of pixels per image in one direction). Pixels having a side length of approximately 5 μm may be provided, which enables to obtain the desired transparency effect. Indeed, distance dpix between pixels being in the order of 14 μm in this example, there remains, between neighboring pixels, a distance in the order of 14−5=9 μm, which may be left free of any opaque or luminous element, and thus enable to see an external scene through the device. For a given eye position, the size of useful portion 202$i$ of each pixel sub-assembly 105$i$ is in the order of f*Len/e=1.66 mm. Minimum number Qmin of lenses 107$i$ to be provided (in one direction) so that the user can perceive the entire image is equal to the rounding to the next higher integer of value e/f=2.5, that is, 3 lenses (3×3=9 lenses over the entire plate 103) in this example. Maximum number Qmax of lenses 107$i$ which can be provided (in one direction) on plate 103 is equal to the rounding to the next lower integer of the plate length divided by lens size Len, that is, 21/4.14=5.07, that is, 5 lenses (5×5=25 lenses over the entire plate 103) in this example. The user's field of vision is defined by formula 2*arctan(½x), that is, approximately 38 degrees in this example. Calling SchV the additional visual field on either side of the image, with SchV=0.5*((Q*f*Len/e)−Len), Q being the number of lenses of the display in one direction, eye box B can be defined with formula B=2e*SchV/f. In this example, if a number of lenses in one direction equal to Qmax is provided, eye box B is in the order of 10.3 mm in this direction.

The numerical example of the above paragraph defines an embodiment of a display of the type described in relation with FIG. 1 which can reasonably be envisaged. Of course, the described embodiments are however not limited to this specific case. Based on the design rules disclosed hereabove, it will be within the abilities of those skilled in the art to provide other configurations than that provided in this example, for example, by modifying thickness ep of the transparent plate, refraction index n of the transparent plate, distance dpix between pixels, aperture x of optical sub-systems 107$i$, the dimensions in top view of the transparent plate, and/or one or a plurality of the other parameters.

It should be noted that all that has been described hereabove in relation with FIGS. 1 and 4 has been mentioned to explain the operating principle of the provided augmented reality display device. However, in practice, to avoid for the image of the real scene seen by the user to be deformed by optical sub-systems 107i, it is preferable for the light originating from the real scene not to "see" optical sub-systems 107i. To achieve this, a structure of the type described in relation with FIG. 5 may be used.

Figure 5:
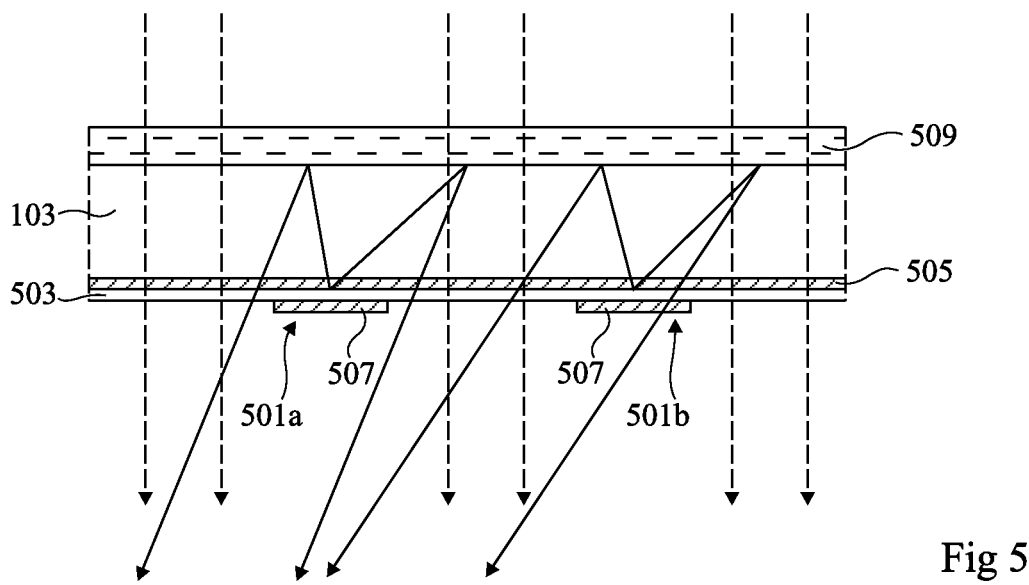
FIG. 5 is a partial cross-section view illustrating an alternative embodiment of an augmented reality image display device.

FIG. 5 is a partial cross-section view illustrating an example of an alternative embodiment of an augmented reality image display device, where the light originating from the real scene is not impacted by the optical sub-systems of the device.

FIG. 5 shows a portion of a transparent support plate 103. In this example, light display pixels are formed on a surface of plate 103 facing the user's eye. In FIG. 5, only two pixels 501a and 501b have been shown. In this example, the pixels have been made in OLED technology and comprise one or a plurality of layers 503 of organic materials between two conductive electrodes 505 and 507. Electrode 505 located on the side of layer 503 opposite to the eye is transparent or semi-transparent, and may be made of a thin silver film having a thickness in the order of a few nanometers. When an adapted voltage is applied between the two electrodes, an electroluminescence phenomenon appears in the organic layer. Pixels 501a, 501b are manufactured to emit light mainly towards the surface of plate 103 opposite to the pixels (that is, towards the inside of the plate) and not to directly emit light towards the eye.

On its surface side opposite to pixels 501a, 501b, plate 103 is topped with an optical system 509 comprising reflective holographic lenses. The lenses of system 509 focus the light originating from the pixels (that is, from the "inside" of plate 103 (rays in full line in FIG. 5), but have not focusing effect on the light originating from the real scene, that is, from the "outside" of the device (rays in dash lines in FIG. 5). From a geometrical optics viewpoint, system 509 is, for the light originating from pixels 501a, 501b, a system of the type described in relation with FIGS. 1 to 4, that is, it comprises a plurality of optical sub-systems capable of collimating the rays emitted by pixels 501a, 501b, so that the information displayed by the pixels is perceived by the user as being at the same distance as the real scene.

An advantage of the provided embodiments is that they enable to obtain an HMD-type augmented relative image display device, which is simpler and more compact than existing devices.

Another advantage is that the electric power consumption of the augmented reality display device is decreased as compared with existing devices.

Another advantage is that the provided device requires no mechanical adjustment specific to a given person.

Another advantage is that the user may have access to all the information displayed in augmented reality without for it to move with respect to the real scene, even when the user's eye moves.

Specific embodiments have been described. Various alterations, modifications, and improvements will readily occur to those skilled in the art.

In particular, although an example of an HMD-type augmented reality image display device appearing in the form of eyeglasses comprising a semi-transparent display in front of each eye has been described in relation with FIG. 1, the described embodiments are not limited to this specific case.

As a first variation, a mask-type augmented reality display device may be provided, which comprises a single display, for example, centered on the midpoint between the user's two eyes. The above-mentioned design rules which correspond to the case of a monocular vision should then be adapted to the additional constraints of a binocular vision. The inventor has shown that the above-described lines of argument, leading to the determination of the useful portions of the pixel sub-assemblies in a direction where the vision is monocular with a non-zero eye box, also apply to the case where the vision is binocular with an eye box having a dimension greater than distance y between the user's two eyes. In binocular vision, for example, in the observer's horizontal direction, if a zero eye box size is desired (B=0), the useful portions of pixel sub-assemblies 105i have dimensions in the order of f*Len/e and are distant by an edge-to-edge distance of Len, the centers of the useful portions being distant by a distance Len+f*Len/e. The useful portions of the peripheral sub-displays have a dimension equal to (Len+y/2)*(f/e). It should be noted that in literature, the average distance ymoy between a person's two eyes is between 60 and 70 mm, typically in the order of ymoy=65 mm. Thus, in practice, y=ymoy may be selected. If an eye box equal to distance y between the observer's eyes is desired, the useful portions of all sub-displays have a same length in the order of f*Len/e and are distant by an edge-to-edge distance Len, the centers of the useful portions being distant by a distance equal to Len+f*Len/e. If an eye box B greater than distance y between the observer's eyes is desired, the useful portions of pixel sub-assemblies 105i are centered in the same way as in the case of an eye box equal to y, but are enlarged by (B−y)*f/2e on both sides. The useful portions of the sub-displays thus have a dimension equal to (Len+B−y)*f/e. The edge-to-edge distance of the useful portions is thus smaller than Len.

As a second variation, an augmented reality display device of eyeglass type where a single one of the two eyes is equipped with a semi-transparent display of the type described in relation with the drawing may be provided.

It should be noted that, in the above-described case where both eyes are equipped with a display, it may be provided, according to needs, to display in front of the left and right eyes a same image or different images.

Further, the described embodiments are not limited to the use of pixels in OLED technology. Other technologies may be used.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

While one or more embodiments of this invention have been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An HMD-type device for displaying an image in augmented reality, comprising:
an assembly of light display pixels arranged on a first surface of a transparent support intended to be positioned on the optical path between a user's eye and a real scene to be observed, this assembly comprising a number N greater than 1 of pixel sub-assemblies, each comprising a sufficient number of pixels to display the entire image; and an optical system arranged on a second surface of said support opposite to the first surface, this system comprising N optical sub-systems, each pixel sub-assembly facing one of the optical sub-systems, wherein number Q of optical sub-systems, in a given direction parallel to said support, is at least equal to the integer greater than value e/f, where e designates the optical path between the optical system and a user's eye, and f designates the focal distance of the optical sub-systems.

2. The device of claim 1, wherein, in front view, neighboring optical sub-systems are contiguous.

3. The device of claim 1, wherein the pixels are non contiguous and the space between pixels is compatible with the visualizing of a real scene in transparency through the support.

4. The device of claim 1, wherein in top view, each pixel is placed in a central portion of a surface free of any other pixel, so that the surface area of the support effectively occupied by the pixels does not exceed 20 percent of the total area of the surface of the support having the pixels arranged thereon.

5. The device of claim 1, wherein, at a given time, only a portion of each pixel sub-assembly, visible with the eye from a determined eye box, is activated.

6. The device of claim 5, wherein said portion has a dimension of approximately f*(Len+B)/e, where f is the focal distance of the corresponding optical sub-system, Len is the diameter of the corresponding optical sub-system, B is the dimension of the eye box, and e is the optical path between the optical system and the eye.

7. The device of claim 6, further comprising an eye tracking device enabling to know, at any time, the relative position of the user's eye with respect to the display device, and a control circuit capable, in each pixel sub-assembly, of activating or deactivating pixels according to the detected eye position.

8. The device of claim 1, wherein each pixel sub-assembly extends over a surface substantially equal to that of the optical sub-system in front of which it is located.

9. The device of claim 1, wherein each sub-assembly contains a sufficient number of pixels to display an image of approximately 320 by approximately 240 pixels.

10. The device of claim 1, wherein the pixels of said pixel assembly are arranged in an array and regularly distributed over the entire surface of the support.

11. The device of claim 1, wherein the pixels are formed in OLED technology.

12. The device of claim 1, wherein said pixel assembly is in an object focal plane of the optical system.

13. The device of claim 1, wherein said support is a transparent plate having a thickness smaller than or equal to 3.5 millimeters.

14. The device of claim 1, wherein said optical system is made in the form of a reflective hologram.

15. The device of claim 1, having the general shape of eyeglasses or of a mask.

16. The device of claim 1, wherein the optical sub-systems are all substantially identical, dimension Len, in a given direction parallel to said support, of an optical sub-system, being approximately equal to value Q*f*Len/e, where Q is the number of optical sub-systems in said direction, f is the focal distance of said optical sub-systems, and e is the optical path between the optical system and a user's eye.

17. An HMD-type device for displaying an image in augmented reality, comprising:
   an assembly of light display pixels arranged on a first surface of a transparent support intended to be positioned on the optical path between a user's eye and a real scene to be observed, this assembly comprising a number N greater than 1 of pixel sub-assemblies, each comprising a sufficient number of pixels to display the entire image; and
   an optical system arranged on a second surface of said support opposite to the first surface, this system comprising N optical sub-systems, each pixel sub-assembly facing one of the optical sub-systems, wherein, at a given time, only a portion of each pixel sub-assembly, visible with the eye from a determined eye box, is activated, wherein said portion has a dimension of approximately f*(Len+B)/e, where f is the focal distance of the corresponding optical sub-system, Len is the diameter of the corresponding optical sub-system, B is the dimension of the eye box, and e is the optical path between the optical system and the eye.

18. The device of claim 17, further comprising an eye tracking device enabling to know, at any time, the relative position of the user's eye with respect to the display device, and a control circuit capable, in each pixel sub-assembly, of activating or deactivating pixels according to the detected eye position.

19. The device of claim 17 wherein number Q of optical sub-systems, in a given direction parallel to said support, is at least equal to the integer greater than value e/f, where e designates the optical path between the optical system and a user's eye, and f designates the focal distance of the optical sub-systems.

20. An HMD-type device for displaying an image in augmented reality, comprising:
   an assembly of light display pixels arranged on a first surface of a transparent support intended to be positioned on the optical path between a user's eye and a real scene to be observed, this assembly comprising a number N greater than 1 of pixel sub-assemblies, each comprising a sufficient number of pixels to display the entire image; and
   an optical system arranged on a second surface of said support opposite to the first surface, this system comprising N optical sub-systems, each pixel sub-assembly facing one of the optical sub-systems, wherein the optical sub-systems are all substantially identical, dimension Len, in a given direction parallel to said support, of an optical sub-system, being approximately equal to value Q*f*Len/e, where Q is the number of optical sub-systems in said direction, f is the focal distance of said optical sub-systems, and e is the optical path between the optical system and a user's eye.

* * * * *

UNITED STATES PATENT AND TRADEMARK OFFICE
CERTIFICATE OF CORRECTION

PATENT NO. : 9,595,138 B2  
APPLICATION NO. : 14/290095  
DATED : March 14, 2017  
INVENTOR(S) : Umberto Rossini Page 1 of 1

It is certified that error appears in the above-identified patent and that said Letters Patent is hereby corrected as shown below:

On the Title Page

Please add:
--(65) Foreign Application Priority Data
May 26, 2014 (EP) 14169892.8
May 30, 2013 (FR) 13/54947--

Signed and Sealed this
Fourteenth Day of July, 2020

Andrei Iancu
*Director of the United States Patent and Trademark Office*